(12) United States Patent
Wong et al.

(10) Patent No.: US 9,784,607 B2
(45) Date of Patent: Oct. 10, 2017

(54) UTILITY MASS FLOW GAS METER

(71) Applicants: Wai Tung Ivan Wong, Hong Kong (HK); Liji Huang, Santa Clara, CA (US); Kowng Shing Ling, Hong Kong (HK)

(72) Inventors: Wai Tung Ivan Wong, Hong Kong (HK); Liji Huang, Santa Clara, CA (US); Kowng Shing Ling, Hong Kong (HK)

(73) Assignee: M-Tech Instrument Corporation Holding Limited, Hong Kong (HK)

( * ) Notice: Subject to any disclaimer, the term of this patent is extended or adjusted under 35 U.S.C. 154(b) by 85 days.

(21) Appl. No.: 15/052,823

(22) Filed: Feb. 24, 2016

(65) Prior Publication Data

US 2017/0241822 A1 Aug. 24, 2017

(51) Int. Cl.
*G01F 1/78* (2006.01)
*G01F 15/00* (2006.01)
*G01F 15/14* (2006.01)
*G01D 4/02* (2006.01)

(52) U.S. Cl.
CPC .............. *G01F 1/78* (2013.01); *G01D 4/02* (2013.01); *G01F 15/005* (2013.01); *G01F 15/006* (2013.01); *G01F 15/14* (2013.01)

(58) Field of Classification Search
CPC ........ G01F 1/78; G01F 15/005; G01F 15/006; G01F 15/14; G01D 4/02
See application file for complete search history.

(56) References Cited

U.S. PATENT DOCUMENTS

| 6,474,132 B1 * | 11/2002 | Hathaway | G01F 1/08 |
| | | | 702/100 |
| 8,994,552 B2 * | 3/2015 | Jiang | H04Q 9/00 |
| | | | 340/870.02 |
| 9,109,935 B2 * | 8/2015 | Yang | G01F 1/6845 |

* cited by examiner

*Primary Examiner* — Jewel V Thompson

(57) ABSTRACT

An electronic utility gas meter using MEMS thermal mass flow sensor to measure gas custody transfer data in city gas metering application is disclosed in the present invention. The meter is designed to have its mechanical connectors identical to those of the current diaphragm gas meters while the insertion metrology unit guided channel is placed coaxially in the main flow channel inside the meter body with gas flow conditioning apparatus. The mechanical installation of the electronic utility gas meter then can be fully compatible with the current mechanical utility gas meters, which allows a seamless replacement. The electronic utility gas meter provides gas metrology that significantly improves the accuracy of the city gas metering, and provides additional benefits for data safety, enhanced gas chemical safety, billing alternatives and full data management either locally or remotely.

19 Claims, 5 Drawing Sheets

UTILITY MASS FLOW GAS METER

BACKGROUND OF THE INVENTION

1. Field of the Invention

Figure 1:
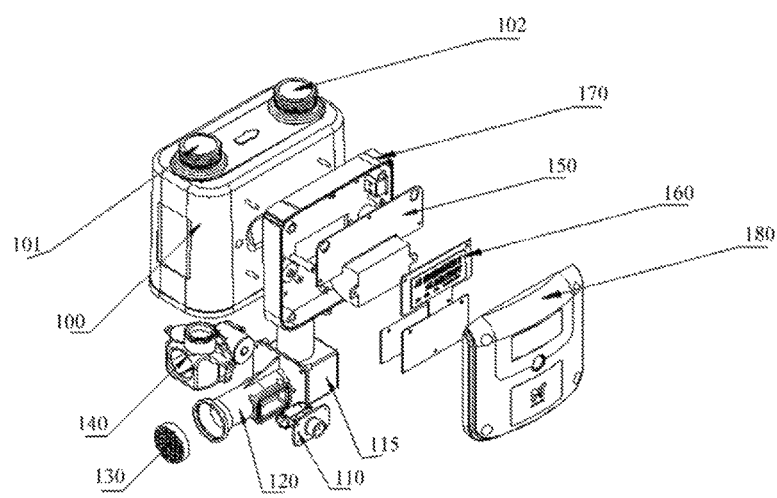

This invention relates to apparatus for measurement of natural gases in city gas metrology. Specifically this invention relates to an all-electronic utility gas metering using micro-machined silicon flow sensors or Micro Electro Mechanical Systems (MEMS) mass flow sensing technology to meter the city gas in the utility industry requiring custody transfer or tariff. This invention also provides the design and make of an all-electronic mass flow meter with remote data capability and other intelligent functions, which can be used to directly replace existing diaphragm gas meters for the utility industry without modification of the current installation schedules.

2. Description of the Related Art

Utility gas meters for city gas metering has been dominated b the mechanical diaphragm meters that have been invented some 170 years ago by a UK inventor, Thomas Glover. Since then, the materials that used to make the diaphragm gas meters have been improved, but the measurement principle and basic structure/configuration remain intact. The diaphragm meter measures the accumulated volumetric flowrate which is used for custody transfer or tariff bill to users. The beauty of this technology has been proven in its long history for its reliability and self-powered metering. However, the gas volumetric data are not constant against temperature and pressure variations. As the statistic consumption of the city gas will be about 5 times higher in winter compared to that, in summer, the city gas companies usually run a loss on the average and heavy government subsidy is often applied for the sustained operation of the city gas companies. There were since many efforts to improve the diaphragm meter technology in particular for solving the data dependence on temperature variations, e.g., D. E. Bruce and J. L. Esola, Temperature compensated gas meter, U.S. Pat. No. 4,538,458. However, the reliability and accuracy of those improvements had not been well proven and adopted for the field deployment. On the other side, the demands for networking or smart utility meters have led a number of efforts to add a mechanical data reader and electronic data converter for data relay. These efforts have not solved the basic requirements for gas data accuracy for custody transfer or tariff.

With the advancement of integrated circuitry industry, electronics gas meters have started to emerge. In mid-1980s, ultrasonic gas meters had been field tested and deployed in some European countries (see for example, W. Taphorn et al., Ultrasonic gas meter, U.S. Pat. No. 5,433,117). It has been hoped that the ultrasonic technology would be much easier to incorporate pressure and temperature sensors for better compensation of environmental variations on the gas metrology, but due to the cost and performance issues, the replacement of the mechanical meters has not been made possible as of today. Pearman et al. (A. N. J. Pearman et al, Electronic gas meter, U.S. Pat. No. 4,918,995) teaches an electronic gas meter using a MEMS mass flow sensor that shall have the automatic temperature and pressure compensation which further simplified the compensation scheme and reduced the cost for such. However, the construction and the electronics in the earlier 1990s were far more complicated to achieve the necessary metrology requirements. In addition, the MEMS sensor probe had its wire exposed to the detecting gas media which was prone to reliability issues. Matter (D. Matter et al., Increased accuracy gas energy meter, U.S. Pat. No. 7,222,028) proposed a new electronic gas meter with a MEMS mass flow sensor having an application specific integrated circuitry. The meter configured had the potential with a low cost because of the simplified electronics but the products based on this patent covered only a single utility gas meter model which made the application impractical. Muraoka et al. (Muraoka et al, Flowmeter, U.S. Pat. No. 7,861,585) disclosed an electronic gas meter with dual MEMS sensors for high flow rate utility gas measurement targeting users such as industrial applications, but due to the design with a high pressure drop, applications in city gas metrology could merely be realized. Nonetheless, the MEMS sensing technology based utility gas meters require far less components and can have a simple configuration that makes it possible to excel the current mechanical diaphragm utility gas meters with the desired enhancement in accuracy, adding advantages in electronic data safety, data management, and remote metering management, which could further be used for energy saving and conservation.

Jiang (C. Jiang et al., MEMS utility meters with exchangeable units, U.S. Pat. No. 8,994,552) and Yang (X. Yang et al, MEMS utility meters with, integrated. mass flow sensors, U.S. Pat. No. 9,109,935) have addressed the application requirements for utility gas applications for commercial and industrial users, but these designs could not be easily adopted for residential applications as the it is virtually impractical to alter the installation conditions for the vast numbers of the residential utility gas meters in the field. Filed installation of the special mechanical connectors shall not only be extremely costly but the often limited space at installation in the residential conditions shall not allow such operations. In addition, unlike the commercial and industrial gas metering applications, for the residential applications, the meters sometimes also require an integrated valve system that can be used to shut off the valve in case of emergency. The valve system shall also help for tariff management where the remote data or bill is not possible.

Therewith it is desired for this invention that a new design of MEMS based utility gas meter for residential applications shall be necessary. The new design shall be compatible in installation with the existing mechanical diaphragm meters for the practical deployment without having any impact to the meter metrology performance in line with the international utility gas metering standards while maintaining a similar mechanical connection configuration with the existing mechanical diaphragm meters such that the meters could be easily adopted in different field conditions.

SUMMARY OF THE INVENTION

It is the objective of this invention to have a new all electronic utility gas meter based on the MEMS sensing technology for residential city gas metering applications that shall have met the metrology requirements of the city utility gases while the MEMS sensing chip shall provide the automatic compensations to the volumetric gas values due to gas pressure and temperature variations. The invented meter shall have the same mechanical connection configuration as those in the existing mechanical diaphragm utility gas meters. The invented meter shall also have the functionality that can ensure the data safety, data process and transmission to, the remote networking as well as data communication capability. The invented meter shall further have the integrated safety valve that shall response to the gas emergency shut-off to cut the gas supply from the gas pipeline. Such a safety valve shall additionally serve as the gauge vehicle for gas tariff pre-payment or advanced billing.

In one preferred embodiment, the invented all residential utility gas meter that is compatible with the mechanical diaphragm utility gas meter installation connecting schemes shall preferably have the gas inlet and outlet being configured into and "U" shape which is similar to the mechanical diaphragm utility gas meters, i.e. both the inlet and outlet connected to the supply gas pipelines shall be positioned in the upper body of the said meter towards the up direction of the said meter. The distance shall be arranged such that it is in compatible with the city gas meter standards allowing a seamless replacement to the mechanical diaphragm meters without additional cost for installation. This configuration shall allow the meter perform as desired without adding additional straight pipes to the existing gas supply pipelines as required by the previous disclosures for the MEMS utility gas meters.

In another preferred embodiment, the invented all-electronic residential utility gas meter that is compatible with the mechanical diaphragm utility gas meter installation connecting schemes shall utilize MEMS mass flow sensors as the sensing elements. The MEMS mass flow sensors shall have integrated thermistors that can be used to measure the temperature changes when the gas media flow over the thermistors whilst one of the thermistors preferably positioned in the middle of the other thermistors shall be heated up to a temperature above the ambient temperature. One independent thermistor shall be able to measure, the thermal conductivity of the gas media against the ambient temperature variation as well. Such a configuration of the thermistors shall ensure the MEMS flow sensors having the capability of direct measurement of the mass flowrate of gas media without the requirements of additional temperature and pressure compensation for the gas media.

In another preferred embodiment, the invented all-electronic residential utility gas meter that is compatible with the mechanical diaphragm utility gas meter installation connecting schemes shall have limited components for cost advantages where the measurement component shall contain the MEMS sensing assembly, the main flow channel; the electronic control unit shall have all the electronics that provide the signal conditioning of the MEMS sensing assembly, data acquisition from the MEMS sensing assembly, data processing, data safety management, as well as data interface for data transmission and the remote user communication. The electronics control unit shall further relay the processed data to the local display, preferably made of a low power LCD, and manage the power usage of the system. One preferred component shall be the safety valve that shall provide the capability to cut off the gas supply at emergency as well as the control for tariff such as pre-payment or remote billing schedules. Additional components include the meter covers and other parts for directing the gas flow and gas sealing from leakage.

In another preferred embodiment, the invented all-electronic residential utility gas meter that is compatible with the mechanical diaphragm utility gas meter installation connecting schemes shall have the MEMS sensing assembly configured into a probe which is placed as an insertion one into the center of the main flow channel that is made with a Venturi structure for better flow stability. It is preferred that the insertion MEMS sensing assembly shall also be configured into a small Venturi pipe where the MEMS sensor shall be placed at the center throat of the inner Venturi structure. For further enhancement of gas flow stability and measurement repeatability, a pair of flow straightener and conditioner is placed at the inlet of the main flow channel. This invented meter with dual Venturi structure and a pair of flow straightener and conditioner ensures the high accuracy and performance that shall be critical for residential gas tariff applications.

In another preferred embodiment, the invented-electronics residential utility gas meter that is compatible with the mechanical configuration of the existing mechanical diaphragm utility gas meter shall have the capability to detect and process the data with different city gases. This functionality is preferably performed via the integrated MEMS gas thermal conductivity and capacitance sensors. At the pre-programed time period, both of the said sensors shall relay the measured data to the control electronics that will execute the comparison of the current running value with the relayed values. If any differences are above the preset limit, an alarm shall be registered and an event shall be stored in separate memory in the control electronics, and an event code shall be displayed on the meter's local display. The meter shall then proceed to execute the automatic gas composition correction. In case that the meter is connected to the network, the registered event shall be automatically transmitted to the data or service center.

In another preferred embodiment, the invented all-electronics residential utility gas meter that is compatible with the mechanical configuration of the existing mechanical diaphragm utility gas meter shall have plural numbers of memory units. It is preferably that such numbers of memory units shall not be less than three in case of any malfunctions may happen. The measured metrology data shall be stored independently into these memories via factory preset program or a user programmable interface. These data in the independent memories shall be able to be retrieved onsite or be transmitted to the data or service center at a time interval determined by the user. The stored data shall further be able to be retrieved by the onboard micro control unit (MCU) and such data shall be examined and compared at the interval also pre-determined by the user via the user interface. In case of any discrepancy, an event or alarm shall be registered at a different memory that can be retrieved onsite or be transmitted to the data or service center if the meter is connected to the network.

In yet another preferred embodiment, the invented all-electronics residential utility gas meter that is compatible with the mechanical configuration of the existing mechanical diaphragm utility gas meter shall have an integrated safety valve that shall be served as the cut-off to the city gas supply pipelines in case of emergency such as fire or natural disasters. It is preferably that such safety valve can be remotely controlled which would be an efficient approach when natural disasters happen at a specific geographic region. The said safety valve shall be further triggered by an associate sensor such as an earthquake sensor. Further the said safety valve could also be served as a billing approach for pre-payment meters or network enabled billing system, where the meter can be integrated with a pre-payment card reader which is accessible by the electronic control unit that can determine the balance of the payment in comparison with the gas to be supplied. In another configuration the said safety valve could be remotely accessed via the meter's control electronic unit to trigger the balance related cut-off.

In yet another preferred embodiment, the invented all-electronics residential utility gas meter that is compatible with the mechanical configuration of the existing mechanical diaphragm utility gas meter shall have the networking capability which is preferably as an exchangeable independent module inside the said meter. Such a configuration shall extend the usage of the meter at different geographic locations where the networking system or protocol could be vastly different. The said module can be independently programmed or manufactured according to the order specifications.

For the adoption of the all-electronic utility gas meters for city gas metering, this invention provides a solution for direct replacement of the existing residential mechanical diaphragm meters without additional cost of piping at installation. The said invention shall have the desired performance for energy management and saving with the compensation of environmental variations such as, temperature and pressure. In particular the said meter can be data logged and remotely managed via network without the requirements of existing approaches with a mechanical reading to electronic data conversion that is not only costly but does not provide the desired performance. Further, the said invention provides data safety, easy installation, and maintenance.

BRIEF DESCRIPTIONS OF THE DRAWINGS

FIG. 1 The explosive view of the invented all-electronic utility residential gas meter assembled with the features that are fully compatible with the existing mechanical diaphragm utility gas meters.

Figure 2:
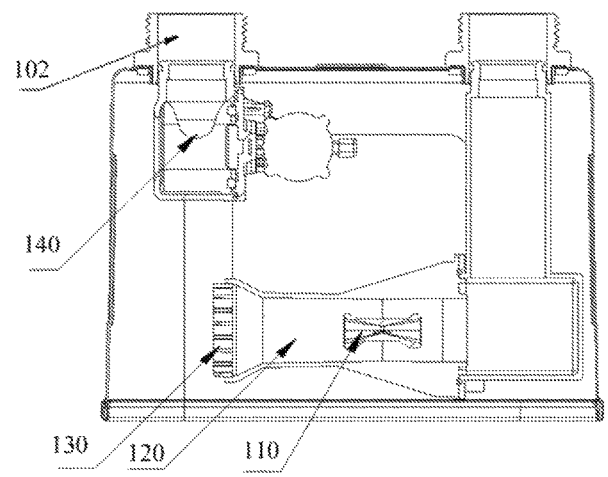

FIG. 2 The perspective view of the invented all-electronic utility residential gas meter showing the positions of the major components inside the said meter.

Figure 3:
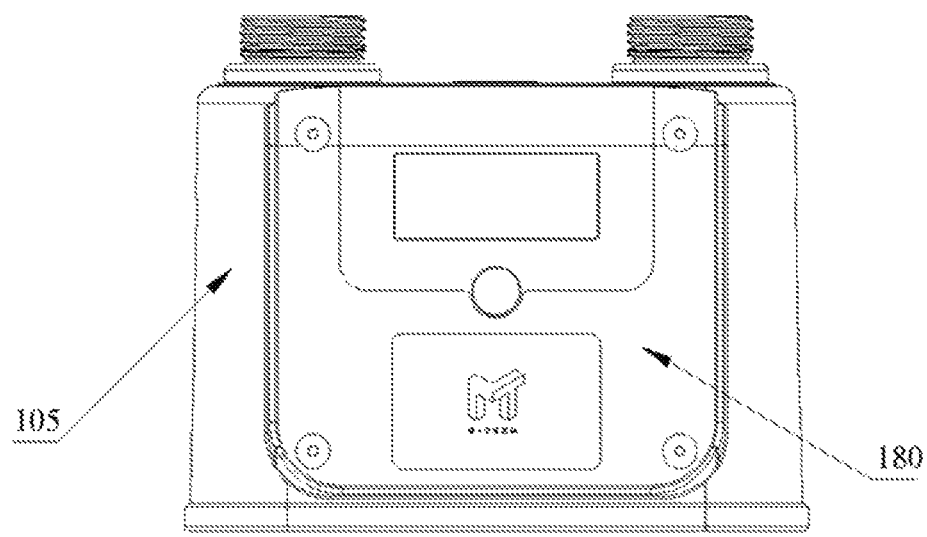

FIG. 3 Exhibition of the front view of the final assembled said meter

Figure 4:
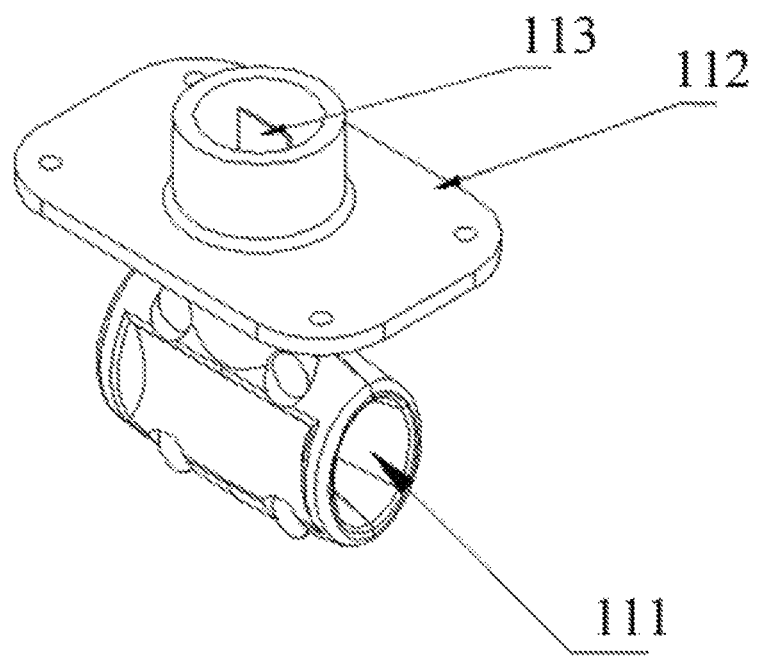

FIG. 4 Exhibition of the design of the MEMS flow sensing assembly that is placed inside the main flow channel of the meter.

Figure 5:
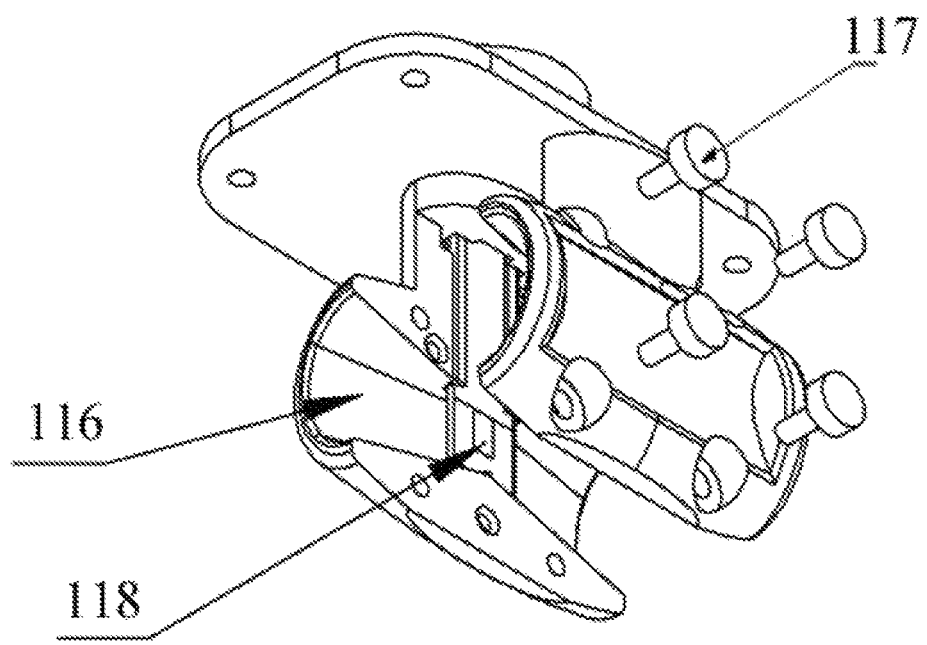

FIG. 5 Exhibition of metrology unit has the house for the MEMS flow sensor house with a guided flow channel.

DETAILED DESCRIPTION OF THE PREFERRED EMBODIMENTS

The explosive view of the all-electronic residential utility gas meter using MEMS sensing elements as the metrology unit disclosed in this invention is shown in FIG. 1. The said gas meter is designed with the meter body (100) with gas inlet (101) and gas outlet (102). The meter body is an enclosed cavity with tight hard sealing for gas leakage proof. The distances between gas inlet and outlet shall be the same as those specified for the mechanical diaphragm utility meter models such that the said meter installation shall not require any alternation of the city gas supply pipelines when doing a direct replacement of the existing mechanical meters by the said meter. Further, the pipe thread at the connectors for both the gas inlet and outlet shall he able to be customized according to the requirements for specific geographic regions. The connectors are preferably welded onto the meter body which is a cost saving approach with better leakage proof. The meter body (100) shall be made with sheet metals for cost saying as compared to those by the existing mechanical diaphragm meters but alternatively it shall he made by casting aluminum for possible future refurbishing as a consideration of total cost saying since unlike the diaphragm meters, the metrology unit of the said meter shall he able to he replaced after the standard meter lifetime.

The other detailed components used for construction of the invented all-electronic residential utility gas meter are illustrated by the explosive view of the preferred meter in FIG. 1. The metrology unit (110) is made of a MEMS mass flow sensor house that contains the sensor chip and the flow channel that registers the flow profile. The flow channel can be made of corrosion proof metal such as stainless steel or fiber enforced engineering plastics but preferably engineering plastics for cost saving in particular for residential metering applications. The metrology unit is in the form of an insertion probe which is further placed into the main flow channel (120) of the said meter. The main flow channel can also be made of corrosion proof metal such as stainless steel or fiber enforced engineering plastics. The main flow channel is connected with a cubic buffer chamber (115) which is further connected to the outlet pipe in a perpendicular formality such that the gas flow can be channeled to be compatible with the existing diaphragm meters. The buffer chamber shall serve for assisting the flow stability of the metering gases. Both the buffer chamber and the connection pipe can be made of corrosion proof metals such as stainless steel hut preferably fiber enforced engineering plastics. At the entrance of the main flow channel, a flow conditioner (130) is assembled. This flow conditioner shall ensure the incoming flow media being kept at a repeatable profile that shall be necessary for the high metrology accuracy for the custody transfer requirements.

The on off gas safety valve (140) is placed right after the inlet of the meter. While the one opening of the valve is connected to the inlet of the said gas meter, the other opening of the valve is left unconnected, which creates a large buffer space for flow stability that shall he helpful for the desired metrology accuracy. The valve is preferably driven by a low power electrical motor that only consumes power when the valve or close execution is required. In additional to the gas safety function for cutting of the gas supply at certain emergency, the valve can also be used for prepayment gas meters which controls the gas billing or billing references to customers. In the late case, a reset button shall be place in front of the said meter such that the closed valve can be accessed for reopen once the claims of the billing are cleared.

The metrology unit (110), the main flow channel (120) with the flow conditioner (130), the buffer chamber (115) and the gas valve (140) shall all be placed inside the meter body (100) and tight sealed according to the leakage proof requirements. In addition to the mechanical interface of the gas inlet and outlet, the only electrical interface is on the metrology unit (110) and it shall be made accessible via a leakage proof feedthrough to the main electronic control unit of the said meter as described hereafter.

The parts that attached to the said meter body shall contain the main electronic control unit (150) with the high capacity lithium ion battery that shall be packaged for safety purpose. The main control electronic unit shall perform the data acquisition from the metrology unit (110) and process of the data against the metrology standard conditions. The unit shall also have the function of data safety by register the acquired data in multiple memories. The unit shall further execute the programmed function for controlling the gas valve, direct the data interface with external inquires, maintain the battery power level, and drive the local display of the designated metering information. The liquid crystal display unit (160) is further attached to the control unit via a printed circuitry board interconnection. Both of these two main electronic board are placed and fixed onto the control unit box (170) which is attached to the meter body (100) via the metal bolt and nuts. The said meter completed its final assembly by close the cover (180) onto the control electronics and display. FIG. 2 and FIG. 3 exhibit the positions of each part described above inside the said meter body (FIG. 2) and the front view of the final assembled said meter (FIG. 3).

The detailed construction of the metrology unit is shown in FIG. 4 and FIG. 5. The said metrology unit has the house for the MEMS flow sensor house with a guided flow channel (111), a MEMS flow sensor chip interface (113) and a sealing plate (112). The guide flow channel has a Venturi structure (116). The MEMS flow sensor chip is placed at the center of the Venturi throat where the flow speed is at the highest such that the sensitivity of the said MEMs mass flow sensor can be maximized. The whole assembly can he made with molded parts and for the simplicity of the manufacture process. The guided flow channel can be made into two parts (FIG. 5) in which one part can be clipped tight with the bolts (117). After the metrology unit is assembled, it shall be in a form of insertion probe which is further place into the main flow channel (120). The center of the guided flow channel shall be aligned well with the center of the main flow channel. This shall serve as dual gas flow conditioning by combining the installed gas flow conditioner at the entrance of the main flow channel. The MEMS flow sensor chip interface can be made with printed circuitry board with that is sealed tight with epoxy. The connector on the printed circuitry board shall further connected to the feedthrough which serves as the interface to the main control electronics (150).

The invention claimed is:

1. An electronic utility gas meter with MEMS mass flow sensors and identical mechanical connection configurations as those for diaphragm utility gas meters comprising
    A meter body that has identical inlet and outlet mechanical connectors compatible to those for diaphragm utility gas meters and provides tight enclosure for main flow channel and MEMS mass flow sensing module;
    A metrology unit having a guided flow channel and an insertion MEMS sensing probe placed and aligned at the center of the guided flow channel;
    A main flow channel shall have a diameter identical to the inlet or outlet of the said meter; the said guided flow channel of the metrology unit shall be inserted into the main flow channel and centrally aligned with the main flow channel;
    A buffer box connects the exit end of the main flow channel and the pipe to the outlet of the said meter;
    A flow conditioning apparatus that shall be installed at the inlet of the main flow channel for maintaining a stable and reproducible gas flow;
    A gas safety valve that also serves for prepayment billing control installed at the inlet of the said gas meter inside the meter body;
    A control electronic unit that has the capability to acquire and process the data from the MEMS mass flow sensor, and store and relay the data from the metrology unit;
    A battery pack that provides the power to the MEMS mass flow sensor and sensor signal conditioning electronics, gas safety valve operation as well as data storage; and
    A meter cover with the display window that enclose the control electronics unit, displays as well as battery power pack.
2. The electronic utility gas meter with MEMS mass flow sensors of claim 1 wherein said meter body shall have the identical inlet and outlet mechanical connectors configured as those for the existing, mechanical diaphragm meters with the gas inlet and outlet setting apart according to the current international standards but towards the same direction.

3. The electronic utility gas meter with MEMS mass flow sensors of claim 1 wherein said meter body shall be made of preferably sheet metal or other non-corrosive metal or metal alloy materials or other non-corrosive engineering plastic materials that can be tightly sealed for leakage proof with a maximum gas pressure of 10 bar but preferably 2 bar for easy manufacture and cost saving.

4. The electronic utility gas meter with MEMS mass flow sensors of claim 1 wherein said gas inlet and outlet shall be threaded with options in accordance to the geographic local standards such as NPT (normal pipe thread), British pipe thread (BSPT) or other form of pipe threads; and with specific requirements for a large flow pipe size such as over 2 inch of diameter the inlet and outlet can be further made of flanged connection.

5. The electronic utility gas meter with MEMS mass flow sensors of claim 1 wherein said metrology unit having a guided flow channel where the MEMS mass flow sensor shall be placed with its sensing elements aligned to the center of the guided flow channel and the surface of the sensor element direction aligned perpendicular to the flow direction.

6. The electronic utility gas meter with MEMS mass flow sensors of claim 1 wherein said MEMS flow sensing elements shall be plural such that the desired dynamic range can be achieved; and the elements shall be able to function as calorimetric and/or thermal dissipative or time-of-night sensing with which each sensing function shall be preferably acquiring the different dynamical flow speed signal in accordance with the meter specifications.

7. The electronic utility gas meter with MEMS mass flow sensors claim 1 wherein said main flow channel shall have a diameter exactly the same as those for the inlet or outlet connector; and the main flow channel shall house the insertion MEMS flow sensors with guided flow channel with its one end open to the inside of the meter body but towards and under the inlet while another end shall be connected to a buffer box.

8. The electronic utility gas meter with MEMS mass flow sensors claim 1 wherein said guided flow channel shall have a diameter that is one fourth to one eighth of that of the main flow channel, but preferably one sixth of that of the main flow channel.

9. The electronic utility gas meter with MEMS mass flow sensors of claim 1 wherein said metrology unit shall have the guided flow channel which preferably shall have a Venturi structure for which the diameter of the channel entrance shall be 2 to 10 times larger than the size of the throat where the MEMS sensing element is placed, but preferably 3 times.

10. The electronic utility is meter with MEMS mass flow sensors of claim 1 wherein said buffer box connected to the outlet side of the main flow channel shall be in the firm of a cubic formality for easy installation and manufacture; and the volume of the buffer box shall be 2 to 6 times of a sphere with its diameter the same as the main flow channel, but preferably 3 times.

11. The electronic utility gas meter with MEMS mass flow sensors of claim 1 wherein said buffer box shall have one side connected to the main flow channel while another side connected to a pipe with identical diameter of the outlet connector which further engaged to the outlet of the meter body with leakage proof.

12. The electronic utility gas meter with MEMS mass flow sensors of claim 1 wherein said flow conditioning apparatus shall be comprised of a flow profiler and a flow straightener that shall be sequentially installed at the entrance of the main flow channel for the purpose of maintaining a reproducible flow media; the distance between the flow profiler and the straightener shall be one sixth to one half of the diameter of main flow channel but preferably one third of the diameter of the main flow channel; and in case of a low pressure drop across the main flow channel is required, the said flow conditioning apparatus could be comprised of only flow straightener.

13. The electronic utility gas meter with MEMS mass flow sensors of claim 1 wherein said gas safety valve shall be preferably installed inside the said meter body at the inlet end with the valve outlet open above the inlet of the main flow channel; and the valve is preferably to be low power electrically driven motor valve to meet the explosive and hazard gas proof requirements.

14. The electronic utility gas meter with MEMS mass flow sensors of claim 1 wherein said control electronics unit shall provide the data process of the acquired electronic signals from the sensing elements; the control electronics shall further route the data safety into different storage units, and preferably into three separate storage units such that any electronic malfunctioning shall not impact the data safety; the control electronics shall additionally control the gas valve to execute the close/open function in case of a safety event or billing schedule; in the case that the meter is connected to a network the control electronics shall response to the remote inquires or automatically transmit any data registry to the data center or service center while display such on the meter LCD display; and the control electronics shall also perform power status monitor and evaluation, and send alarm register preferably at least three months in advance before the end of the battery power.

15. The electronic utility gas meter with MEMS mass flow sensors of claim 1 wherein said control electronics unit together with the MEMS sensor chips shall have the capability of operating with a microwatt power such that the battery power can provide reasonable field operation time, preferably ten years, but not less than six years.

16. The electronic utility gas meter with MEMS mass flow sensors of claim 1 wherein said control electronics unit shall provide the interface for wired or wireless transmission apparatus such as blue tooth, Zigbee, infrared transmission and/or general packet radio service (GPRS) transmission apparatus, respectively.

17. The electronic utility gas meter with MEMS mass flow sensors of claim 1 wherein said battery pack shall be preferably constituent of lithium ion batteries and shall have the capacity at least of nine ampere hours, and preferably nineteen ampere hours; the battery pack shall provide the power to the MEMS sensors, the gas safety valve as well as the control electronic unit at the standalone operation mode, and shall serve as the backup power in case that the meter is externally powered in a network or by safe external power sources.

18. The electronic utility gas meter with MEMS mass flow sensors of claim 1 wherein said display unit shall be preferably made a liquid crystal display (LCD); the display shall have the capability to operate at low environmental temperature as low as negative forty Celsius; and the display shall not only display the metrology data of totalized flow rate and instant flow rate but the status of the meter performance that include power status, gas temperature, and any event or alarm register or error codes.

19. The electronic utility gas meter with MEMS mass flow sensors of claim 1 wherein said display glass cover shall have the capability to withstand external interference by electrical magnetic field; the glass cover shall be preferably coated with transparent metal films that shall meet the requirements by electrical magnetic compatibility standards.

* * * * *

UNITED STATES PATENT AND TRADEMARK OFFICE
CERTIFICATE OF CORRECTION

Page 1 of 1

PATENT NO. : 9,784,607 B2
APPLICATION NO. : 15/052823
DATED : October 10, 2017
INVENTOR(S) : Wai Tung Ivan Wong, Liji Huang and Kwong Shing Ling It is certified that error appears in the above-identified patent and that said Letters Patent is hereby corrected as shown below:

On the Title Page

Item (72) the name of the third inventor had a typo as "Kowng Shing Ling".
Please correct the name as "Kwong Shing Ling".

Signed and Sealed this
Twenty-eighth Day of November, 2017

Joseph Matal
*Performing the Functions and Duties of the
Under Secretary of Commerce for Intellectual Property and
Director of the United States Patent and Trademark Office*